US012559373B2

(12) United States Patent
Huang

(10) Patent No.: US 12,559,373 B2
(45) Date of Patent: Feb. 24, 2026

(54) GRAPHENE NANOWALLS, MANUFACTURING METHOD THEREOF, ELECTRODE AND SUPERCAPACITOR

(71) Applicant: Industrial Technology Research Institute, Hsinchu (TW)

(72) Inventor: Kun-Ping Huang, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 640 days.

(21) Appl. No.: 18/071,524

(22) Filed: Nov. 29, 2022

(65) Prior Publication Data

US 2024/0177943 A1 May 30, 2024

(51) Int. Cl.
*C01B 32/184* (2017.01)
*H01G 11/86* (2013.01)

(52) U.S. Cl.
CPC .......... *C01B 32/184* (2017.08); *H01G 11/86* (2013.01)

(58) Field of Classification Search
CPC ..... C01B 32/182; C01B 32/184; H01G 11/86; B82Y 30/00; B82Y 40/00
See application file for complete search history.

(56) References Cited

U.S. PATENT DOCUMENTS

| | | |
|---|---|---|
| 11,358,869 B2 | 6/2022 | Zeller et al. |
| 2019/0047865 A1 | 2/2019 | Zeller et al. |
| 2019/0051495 A1 | 2/2019 | Liang et al. |

FOREIGN PATENT DOCUMENTS

| | | |
|---|---|---|
| CN | 102015529 | 4/2014 |
| CN | 104505147 | 4/2015 |
| CN | 107619042 | 1/2018 |
| TW | 201422525 | 6/2014 |
| TW | 201704561 | 2/2017 |
| TW | 201919992 | 6/2019 |
| TW | 202233888 | 9/2022 |

OTHER PUBLICATIONS

Nagatsu, Masaaki, et al. "Characteristics of ultrahigh-frequency surface-wave plasmas excited at 915 MHz." Japanese journal of applied physics 38.6A (1999): L679.*
Bo, Zheng, et al. "Multi-linear antenna microwave plasma assisted large-area growth of 6× 6 in. 2 vertically oriented graphenes with high growth rate." Review of Scientific Instruments 91.7 (2020).*
Wu Y, Qiao P, Chong T, Shen Z. Carbon Nanowalls Grown by Microwave Plasma Enhanced Chemical Vapor Deposition. Adv Mater. 2002;14(1):64-7.*

(Continued)

*Primary Examiner* — Richard M Rump
(74) *Attorney, Agent, or Firm* — JCIPRNET

(57) ABSTRACT

A graphene nanowalls (GNW), a manufacturing method thereof, an electrode and a supercapacitor are provided. The manufacturing method of a graphene nanowalls includes: placing a substrate in a microwave plasma apparatus; introducing a hydrocarbon gas and inert gas; and forming a graphene nanowalls on the substrate. The microwave plasma apparatus provides microwave frequency of less than 1 GHz.

9 Claims, 4 Drawing Sheets

(56) References Cited

OTHER PUBLICATIONS

Yu-Wen Chi et al., "New Approach for High-Voltage Electrical Double-Layer Capacitors Using Vertical Graphene Nanowalls with and without Nitrogen Doping", Nano letters., Sep. 2016, p. 5719-5727.

Feifei Huang et al., "Direct Growth of Graphene Nanowalls on Inverted Pyramid Silicon for Schottky Junction Solar Cells", ACS Applied Energy Materials, Jul. 2021, p. 6574-6584.

Zehui Wang et al., "Synthesis of Vertical Graphene Nanowalls on Substrates by PECVD as Effective EMI Shielding Materials", ACS Applied Electronic Materials, Aug. 2022, p. 4023-4032.

Shahzad Hussain et al., "Three-dimensional Si / vertically oriented graphene nanowalls composite for supercapacitor applications", Ceramics International, Apr. 2021, p. 1-8.

Fengsong Qian et al., "Direct growth of high quality graphene nanowalls on dielectric surfaces by plasma-enhanced chemical vapor deposition for photo detection", Optical Materials Express, Oct. 2020, p. 1-10.

Zhiduo Liu et al., "Application of graphene nanowalls in an intraocular pressure sensor", Journal of Materials Chemistry B, Aug. 2020, p. 1-10.

"Office Action of Taiwan Counterpart Application", issued on Nov. 6, 2023, p. 1-p. 5.

* cited by examiner

GRAPHENE NANOWALLS, MANUFACTURING METHOD THEREOF, ELECTRODE AND SUPERCAPACITOR

TECHNICAL FIELD

The technical field relates to graphene nanowalls, a manufacturing method thereof, an electrode and a supercapacitor.

BACKGROUND

With the global emphasis on the environment and energy, the development of electric vehicle technology and related demands are increasing day by day. For this reason, the demand for supercapacitors with high power density, short charging and discharging time, good service life and high reliability for electric vehicles are increased. However, the dimension of Ti/graphene nanowalls (Ti/GNWs) electrodes formed by the prior art is about 1 cm×3 cm, which is much smaller than the minimum dimension of electrodes for commercial capacitors (about 10 cm×10 cm). If the current Ti/GNWs electrodes are connected in series and/or in parallel to reach the dimension of automotive electrodes, it will cause the problem that the volume of the automotive capacitor is too large.

SUMMARY

An embodiment of the disclosure provides graphene nanowalls, a manufacturing method thereof, an electrode and a supercapacitor that may have good area dimension.

One of exemplary embodiments comprises a manufacturing method of graphene nanowalls including: placing a substrate in a microwave plasma apparatus; injecting a hydrocarbon gas; and forming graphene nanowalls on the substrate. The microwave plasma apparatus provides a microwave frequency less than 1 GHz.

One of exemplary embodiments comprises graphene nanowalls produced by the aforementioned manufacturing method of graphene nanowalls.

One of exemplary embodiments comprises an electrode including an electrode substrate and the aforementioned graphene nanowalls.

One of exemplary embodiments comprises a supercapacitor including the aforementioned electrode.

Based on the above, the manufacturing method of graphene nanowalls of the disclosure includes placing a substrate in a microwave plasma apparatus to form graphene nanowalls on the substrate, and the microwave plasma apparatus provides a microwave frequency less than 1 GHz. Thus, the graphene nanowalls formed thereof have good area dimension, for example, large-area dimension with length and width of 10 cm or more, thereby suitable for general electrodes and supercapacitor electrodes.

Several exemplary embodiments accompanied with figures are described in detail below to further describe the disclosure in details.

DETAILED DESCRIPTION OF DISCLOSED EMBODIMENTS

Figure 1:
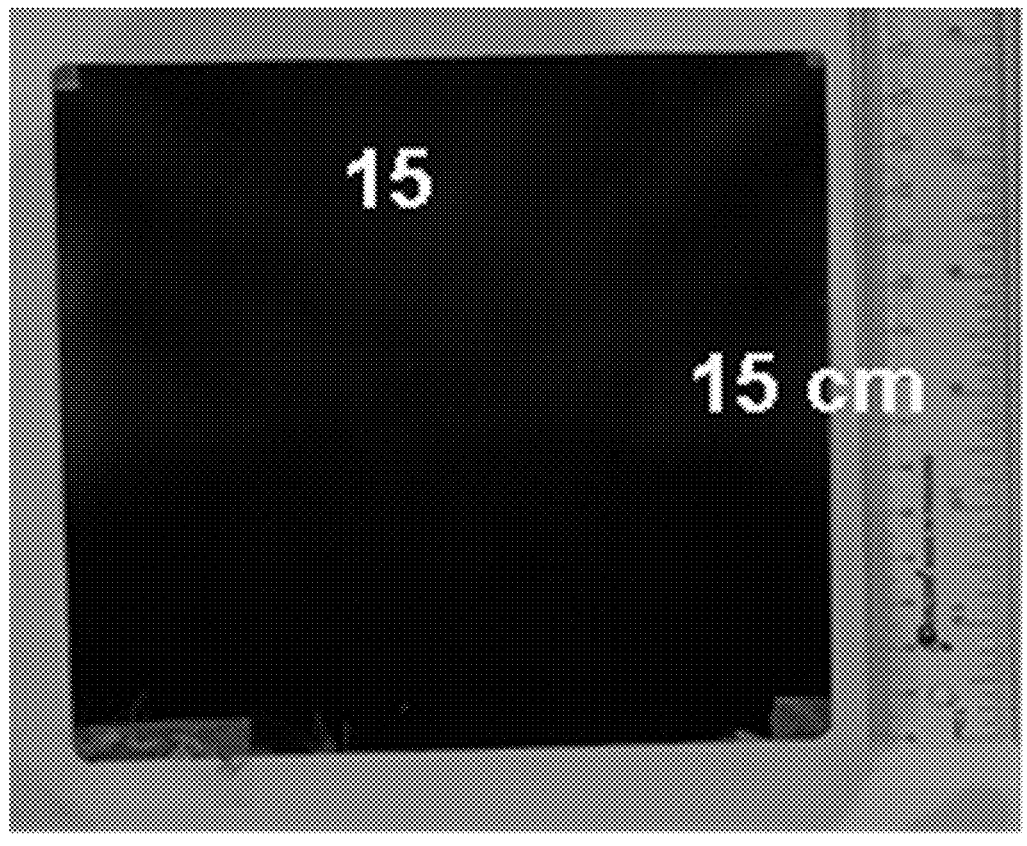
FIG. 1 is a picture of the dimension of graphene nanowalls produced by a manufacturing method of graphene nanowalls according to an exemplary embodiment.

Hereinafter, embodiments of the disclosure are described in detail. The details provided in the embodiments are exemplary, and are not intended to limit the scope of the disclosure. Those having ordinary skill in the art may modify or change the details according to the requirements of actual implementation.

<Manufacturing Method of Graphene Nanowalls>

One of exemplary embodiments comprises a manufacturing method of graphene nanowalls including: placing a substrate in a microwave plasma apparatus; injecting a hydrocarbon gas; and forming graphene nanowalls on the substrate. In addition, an inert gas may also be injected during the process of injecting the hydrocarbon gas.

The microwave plasma apparatus provides a microwave frequency less than 1 GHz, for example, 915 MHz or 650 MHz; preferably less than 915 MHz. The type of the microwave plasma apparatus is not particularly limited, and suitable microwave plasma apparatus may be selected according to needs. In this embodiment, the microwave plasma apparatus may provide a temperature of 700° C. to 1500° C., preferably 800° C. to 1100° C. The temperature provided by the microwave plasma apparatus may be adjusted by a microwave power provided thereof. For example, the microwave plasma apparatus may provide a microwave power of 600 W to 100,000 W, preferably 600 W to 60,000 W (i.e. 60 kW). The microwave plasma apparatus may be a focus microwave plasma (FMP) apparatus or other suitable microwave plasma apparatuses. For example, the focus microwave plasma may provide a temperature of 900° C. or more by generating a high-temperature plasma with high energy density.

A material of the substrate is not particularly limited, but suitable material of the substrate may be selected according to needs. For example, the material of the substrate must be such that the substrate does not melt during the preparation of the graphene nanowalls. The material of the substrate may be a material of an electrode, preferably a material of a supercapacitor electrode. In this embodiment, the material of the substrate may include iron, cobalt, nickel, titanium, chromium, molybdenum, copper, platinum, alloys thereof or other suitable materials, preferably titanium.

The substrate may further include an auxiliary layer thereon. For example, the substrate may have a first surface and a second surface opposite to the first surface. In the case where the graphene nanowalls are intended to be formed on the first surface, the auxiliary layer may be pre-formed on the second surface. A material of the auxiliary layer includes a material having high dielectric constant, preferably a material having a dielectric constant of more than 3, for example, quartz, silicon carbide (SiC), aluminum oxide ($Al_2O_3$), aluminum nitride (AlN), zirconium dioxide ($ZrO_2$) or other suitable material having high dielectric constant; more preferably a material having high dielectric constant and high microwave absorption coefficient, for example, silicon carbide, aluminum oxide, aluminum nitride, zirconium dioxide or other suitable material having high dielectric constant. In the case where the substrate includes the auxiliary layer, the auxiliary layer may assist in absorbing microwaves to generate heat energy, thereby increasing the temperature in the chamber of the microwave plasma apparatus, helping to reduce the process time.

A flow rate of injecting the hydrocarbon gas is not particularly limited, and suitable flow rate may be selected according to needs. In this embodiment, an injecting flow rate of the hydrocarbon gas is 10 sccm (standard cubic centimeter per minute) to thousands sccm (i.e. 1 slm (standard liter per minute)), preferably 10 sccm to 1,000 sccm. The hydrocarbon gas is not particularly limited, but suitable hydrocarbon gas may be selected according to needs. For example, the hydrocarbon gas may include ethyne ($C_2H_2$), ethene ($C_2H_4$), methane ($CH_4$) or other suitable hydrocarbon gases, preferably methane or ethene.

In this embodiment, an inert gas may also be injected at the same time during the process of injecting the hydrocarbon gas. The inert gas may include argon or other suitable gases.

A manufacturing method of graphene nanowalls may be performed at a pressure of 0.1 torr to 100 torr, preferably 0.1 torr to 10 torr. A process time may affect a thickness of the formed graphene nanowalls. The process time may be 3 minutes to 50 minutes, preferably 3 minutes to 10 minutes. For example, the graphene nanowalls with a thickness of 1 mm to 540 mm may be formed within the aforementioned process time.

Since the microwave plasma apparatus may adjust the temperature provided by the microwave plasma apparatus and provide a high-temperature environment through the microwave power, additional heating apparatus is not required in the manufacturing process of the graphene nanowalls. In addition, the temperature in the chamber of the microwave plasma apparatus may also be increased by the substrate including the auxiliary layer.

In this embodiment, the microwave plasma apparatus is turned on after the hydrocarbon gas and the inert gas are injected, and the graphene nanowalls are formed on the substrate by chemical vapor deposition (CVD) in the chamber of the microwave plasma apparatus. Thus, steps such as slurry mixing, coating, rolling and baking in the traditional manufacturing method are omitted, which helps to reduce the process time and cost.

<Graphene Nanowalls>

One of exemplary embodiments comprises graphene nanowalls produced by the aforementioned manufacturing method of graphene nanowalls. The graphene nanowalls may be used directly with the substrate in capacitors such as supercapacitors without being stripped from the substrate.

The length of the substrate used to form the graphene nanowalls may be 10 cm or more, and the width may be 10 cm or more; preferably the length is greater than 10 cm, and the width is greater than 10 cm; more preferably, the length is 15 cm or more and the width is 15 cm or more. Thus, a dimension of the graphene nanowalls comparable to that of the substrate may be formed. The graphene nanowalls produced by the manufacturing method of graphene nanowalls may have a large area dimension, for example, the length may be 10 cm or more and the width may be 10 cm or more; preferably the length is greater than 10 cm and the width is greater than 10 cm; more preferably, the length is 15 cm or more and the width is 15 cm or more, and suitable for electrochemical electrodes and capacitor electrodes such as supercapacitor electrodes.

<Electrode>

One of exemplary embodiments comprises an electrode including an electrode substrate and the aforementioned graphene nanowalls.

In this embodiment, the graphene nanowalls produced by the aforementioned manufacturing method of graphene nanowalls may be used directly with the substrate in capacitors such as supercapacitors without being stripped from the substrate. That is, the electrode substrate may be the aforementioned substrate. The graphene nanowalls may be formed directly on the electrode substrate.

Hereinafter, the disclosure will be described in detail with embodiments. The following examples are provided to describe the disclosure, and the scope of the disclosure includes the categories described in the following patent claims and their substitutions and modifications, and are not limited to the scope of the examples.

Examples of Graphene Nanowalls and Manufacturing Method Thereof

First, a titanium substrate with a dimension of 10 cm×10 cm was put in the chamber of the focus microwave plasma apparatus, and then the pressure in the focus microwave plasma apparatus was evacuated to $5\times10^{-3}$ torr. Next, after injecting argon gas at a flow rate of 50 sccm and methane at a flow rate of 50 sccm into the chamber of the microwave plasma apparatus in sequence, the microwave plasma apparatus was turned on (the microwave power was about 1745 to 1760 W). The reaction is performed at a temperature of 900° C. or more and a pressure of about 0.693 torr for 5 to 6 minutes, and the graphene nanowalls formed on the titanium substrate may be obtained by chemical vapor deposition.

FIG. 1 is a picture of the dimension of graphene nanowalls produced by a manufacturing method of graphene nanowalls according to an exemplary embodiment. It can be seen from FIG. 1 that the manufacturing method of graphene nanowalls may produce graphene nanowalls with a length of about 15 cm and a width of about 15 cm. Thus, graphene nanowalls having good area dimension is formed, and suitable for electrodes requiring large area dimension.

Figure 2:
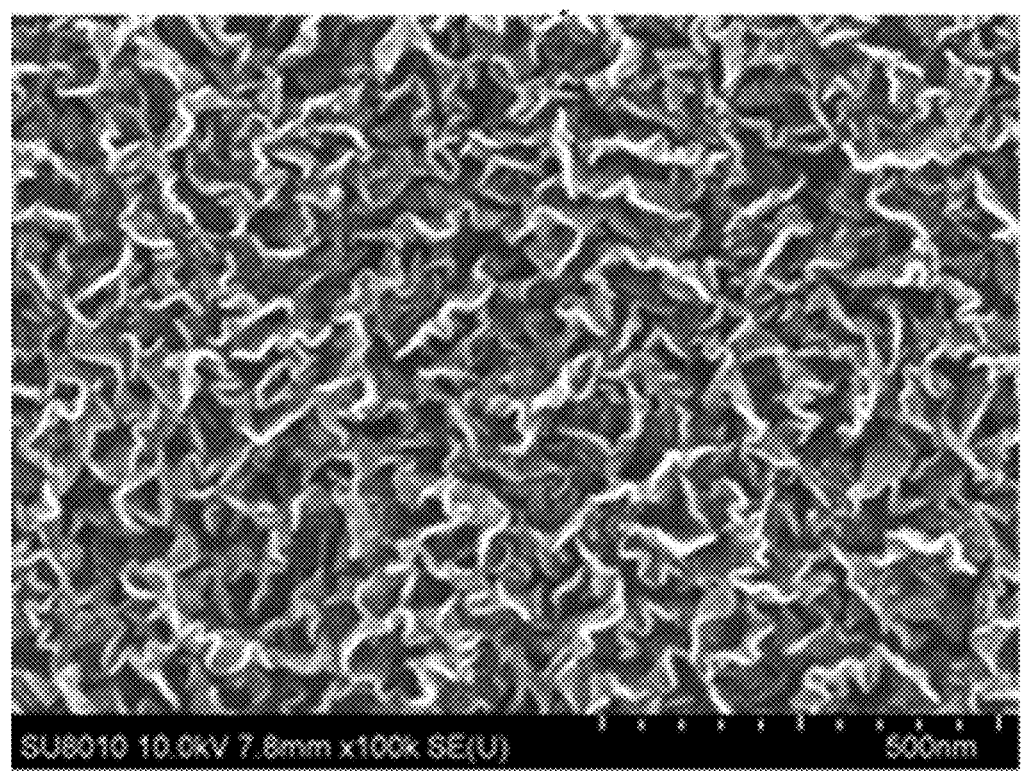
FIG. 2 is a top-view scanning electron microscope (SEM) image of graphene nanowalls produced by a manufacturing method of graphene nanowalls according to an exemplary embodiment.
Figure 3:
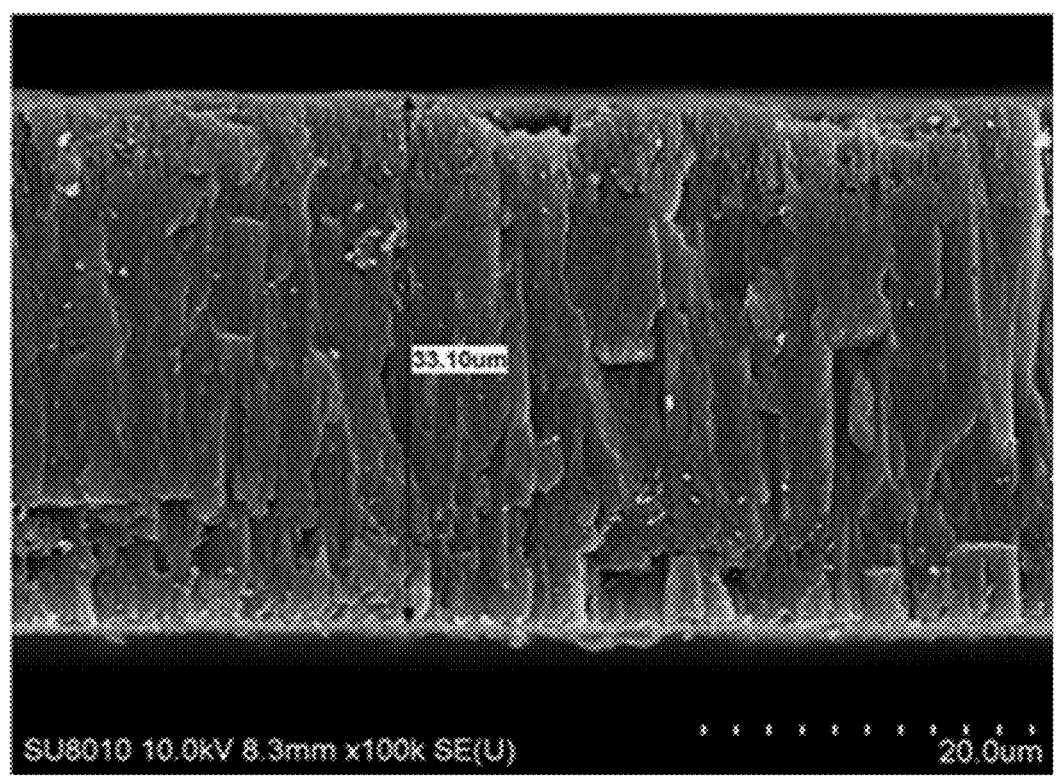
FIG. 3 is a cross-sectional scanning electron microscope image of graphene nanowalls produced by a manufacturing method of graphene nanowalls according to an exemplary embodiment.

FIG. 2 is a top-view scanning electron microscope image of graphene nanowalls produced by a manufacturing method of graphene nanowalls according to an exemplary embodiment. FIG. 3 is a cross-sectional scanning electron microscope image of graphene nanowalls produced by a manufacturing method of graphene nanowalls according to an exemplary embodiment. It can be seen from FIG. 2 and FIG. 3 that the graphene nanowalls produced by the manufacturing method of graphene nanowalls have a large number of pores, uniform distribution of pores and good thickness. Thus, the graphene nanowalls are suitable for general electrodes and capacitor electrodes such as supercapacitor electrodes.

Figure 4:
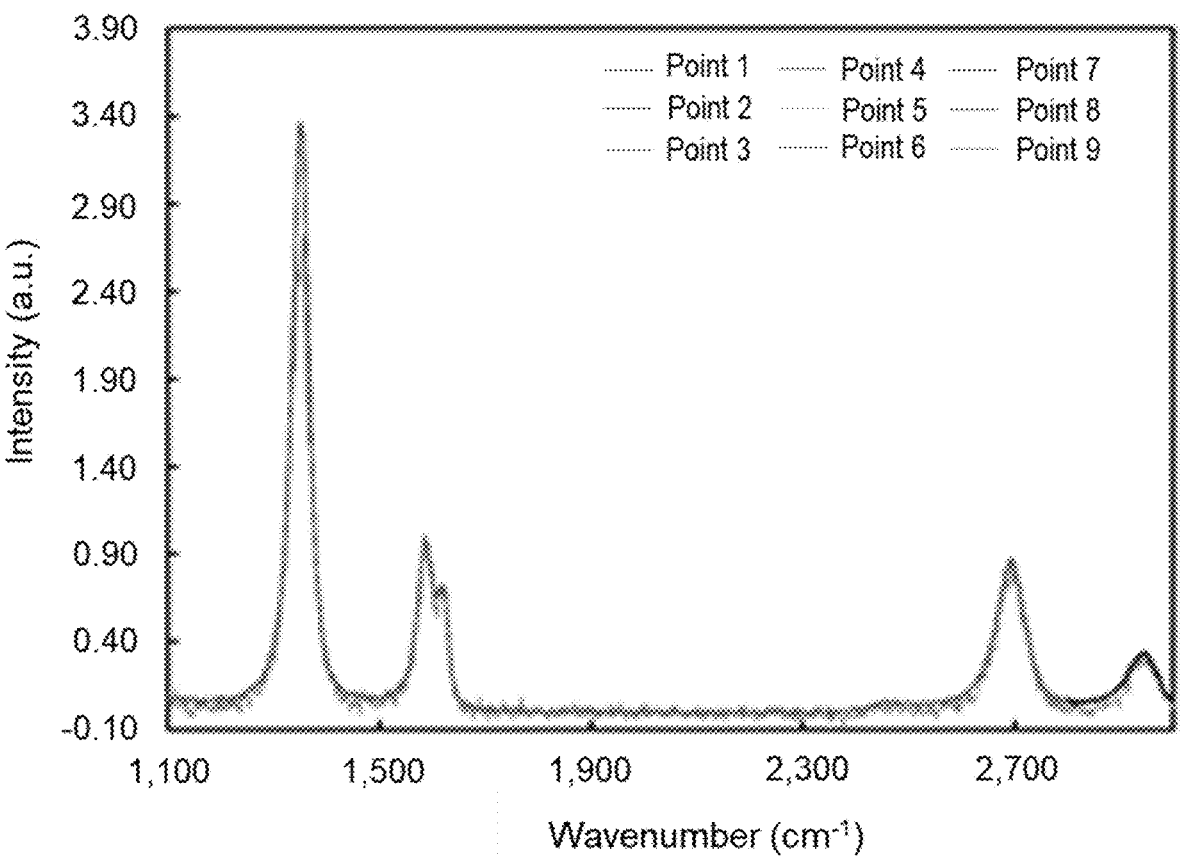
FIG. 4 is a Raman spectrum image of graphene nanowalls produced by a manufacturing method of graphene nanowalls according to an exemplary embodiment.

FIG. 4 is a Raman spectrum image of graphene nanowalls produced by a manufacturing method of graphene nanowalls according to an exemplary embodiment. It can be seen from FIG. 4 that the graphene nanowalls produced by the manufacturing method of graphene nanowalls have good uniformity and quality.

Based on the above, the exemplary embodiments provide a manufacturing method of graphene nanowalls including placing a substrate in a microwave plasma apparatus to form graphene nanowalls on the substrate, and the microwave plasma apparatus providing a microwave frequency less than 1 GHz, the graphene nanowalls formed thereof have good area dimension (large-area dimension), pore number and distribution, thickness, uniformity and quality, thereby suitable for general electrodes and supercapacitor electrodes.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A manufacturing method of graphene nanowalls, comprising:

placing a substrate in a microwave plasma apparatus;

injecting a hydrocarbon gas into the microwave plasma apparatus;

subjecting the substrate to a microwave frequency less than 1 GHz at a temperature of 900° C. to 1500° C.; and forming graphene nanowalls on the substrate.

2. The manufacturing method of graphene nanowalls of claim 1, wherein the microwave plasma apparatus provides a microwave power of 600 W to 100,000 W.

3. The manufacturing method of graphene nanowalls of claim 1, wherein the microwave plasma apparatus is a focus microwave plasma apparatus.

4. The manufacturing method of graphene nanowalls of claim 1, there is no additional heating apparatus.

5. The manufacturing method of graphene nanowalls of claim 1, wherein a material of the substrate comprises iron, cobalt, nickel, titanium, chromium, molybdenum, copper, platinum or an alloy thereof.

6. The manufacturing method of graphene nanowalls of claim 1, wherein an injecting flow rate of the hydrocarbon gas is 10 sccm to 1,000 sccm.

7. The manufacturing method of graphene nanowalls of claim 1, which is performed at a pressure of 0.1 torr to 100 torr.

8. The manufacturing method of graphene nanowalls of claim 1, a process time thereof is 3 minutes to 50 minutes.

9. The manufacturing method of graphene nanowalls of claim 1, wherein the substrate comprises an auxiliary layer, a material of the auxiliary layer has high dielectric constant.

* * * * *